United States Patent
Kudo

[11] Patent Number: 5,870,230
[45] Date of Patent: Feb. 9, 1999

[54] ZOOM LENS SYSTEM

[75] Inventor: Yoshinobu Kudo, Kawachinagano, Japan

[73] Assignee: Minolta Co., Ltd., Osaka, Japan

[21] Appl. No.: 786,803

[22] Filed: Jan. 21, 1997

[30] Foreign Application Priority Data

Jan. 23, 1996 [JP] Japan ................................. 8-009002

[51] Int. Cl.$^6$ .................................................. G02B 15/14
[52] U.S. Cl. .......................................... 359/686; 359/740
[58] Field of Search .................................... 359/686, 740, 359/738, 739

[56] References Cited

U.S. PATENT DOCUMENTS

| | | | |
|---|---|---|---|
| 3,918,798 | 11/1975 | Takano | 359/683 |
| 4,432,615 | 2/1984 | Ikemori | 359/688 |
| 4,516,839 | 5/1985 | Tokumaru | 359/686 |
| 4,623,226 | 11/1986 | Fujii | 359/740 |
| 5,283,693 | 2/1994 | Kohno et al. | 359/691 |

*Primary Examiner*—Scott J. Sugarman
*Attorney, Agent, or Firm*—Price, Gess & Ubell

[57] ABSTRACT

A zoom lens system has a first lens unit located closest to an object side and moves in an optical axis direction during both zooming and focusing and a light shielding plate which moves in a same direction and by same amount as the first lens unit during zooming, while the light shielding plate being stationary during focusing. As a result, adequate light is secured for peripheral areas when the lens system is in focus on a close-range object and the occurrence of flaring is prevented when the lens system is in focus on an object located at infinity.

15 Claims, 15 Drawing Sheets

TAN -0.1013

TAN -0.07135

TAN -0.05738

TAN −0.1013

TAN −0.07134

TAN −0.05737

TAN -0.2054

TAN -0.1726

TAN -0.1448

TAN -0.1165

TAN 0.0

TAN -0.2054

TAN -0.1726

TAN -0.1448

TAN -0.1165

TAN 0.0

TAN −0.07123

TAN −0.06008

TAN −0.05043

TAN −0.05043

TAN 0.0

TAN −0.07121

TAN −0.06006

TAN −0.05041

TAN −0.04057

TAN 0.0

ZOOM LENS SYSTEM

BACKGROUND OF THE INVENTION

1. Field of the Invention

The present invention pertains to a zoom lens system, and more particularly to a zoom lens system suited for a silver halide film cameras and a digital cameras.

2. Description of the Related Art

A zoom lens systems in which the first lens unit located closest to the object has a positive refractive power and said first lens unit moves during zooming and focusing are conventionally known. This conventional zoom lens system, however, has a problem that it is difficult to ensure adequate light for peripheral areas when it is in focus on a close-range object. Because of this problem in, light for peripheral areas have been conventionally secured while the lens system is in focus on a close-range object by means of increasing the effective diameter of the first lens unit.

However, with a conventional zoom lens system, flaring occurs when the lens system is in focus on an object located at infinity.

OBJECT AND SUMMARY

The present invention was made in view of the problems described above. Its object is to provide a zoom lens system when it is possible to ensure adequate light for peripheral areas when the lens system is in focus on a close-range object and when the occurrence of flaring is also prevented when the lens system is in focus on an object located at infinity.

In order to attain the object described above, the zoom lens system of the present invention comprises multiple lens units, wherein the first lens unit which among said multiple lens units is located closest to the object has a positive refractive power and moves along the optical axis during zooming and focusing, and wherein said zoom lens system also has a light shielding plate that moves in the same direction and by the same amount as the first lens unit during zooming but does not move during focusing.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

DETAILED DESCRIPTION OF THE PREFERRED EMBODIMENTS

Embodiments of the present invention are explained below with reference to the drawings.

Figure 1:
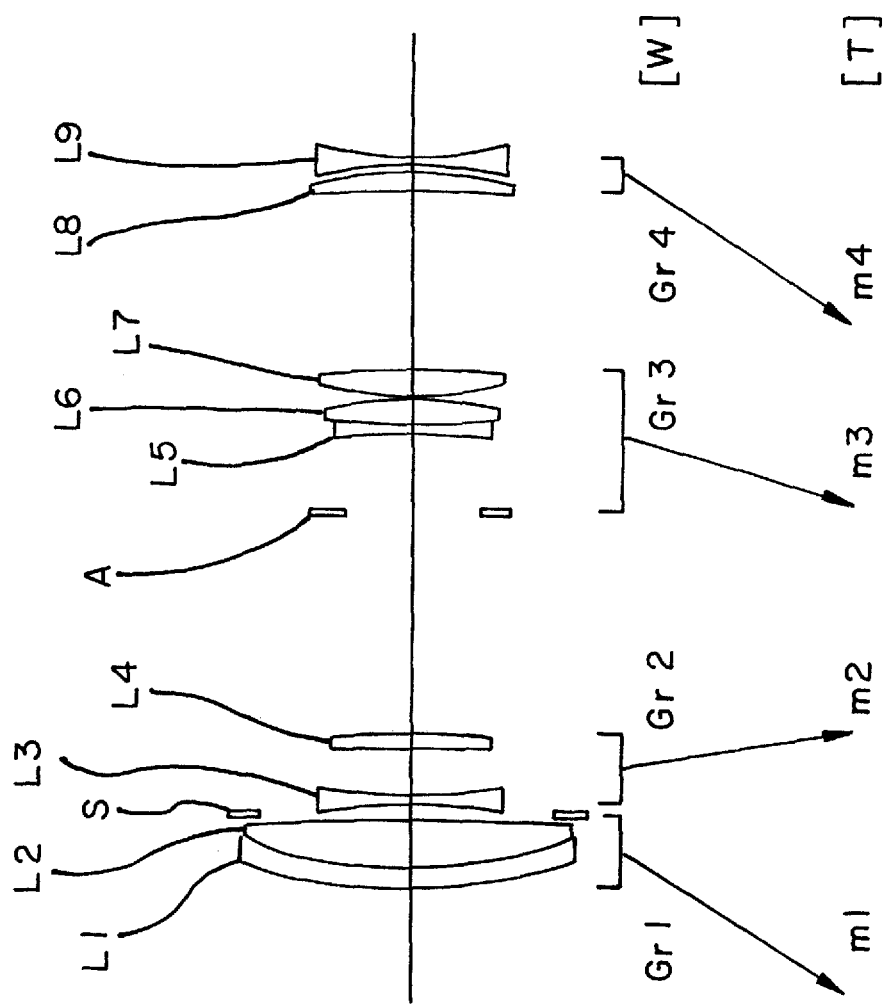
FIG. 1 shows the lens construction of embodiment 1 of the present invention.
Figure 2:
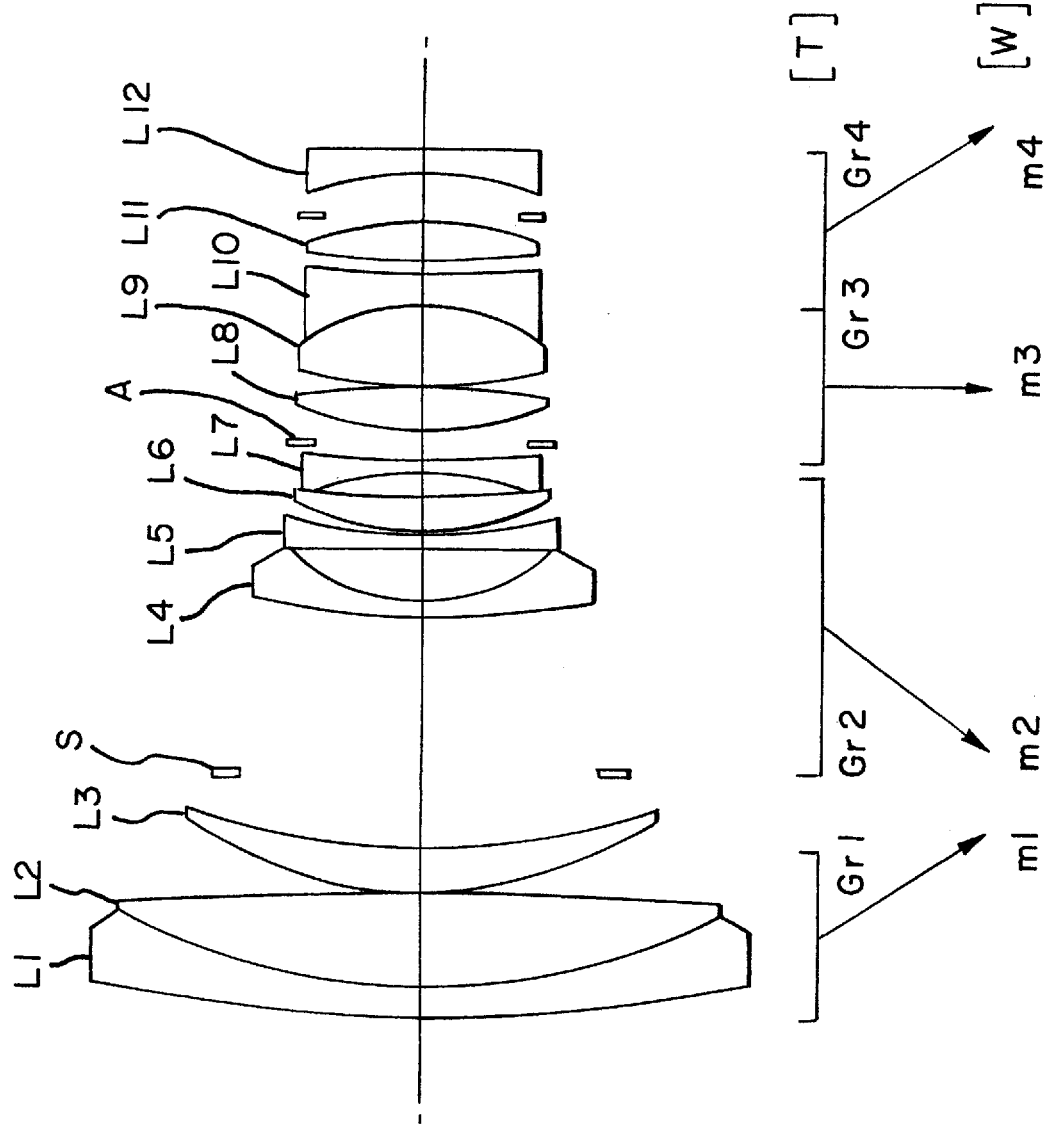
FIG. 2 shows the lens construction of embodiment 2 of the present invention.
Figure 3:
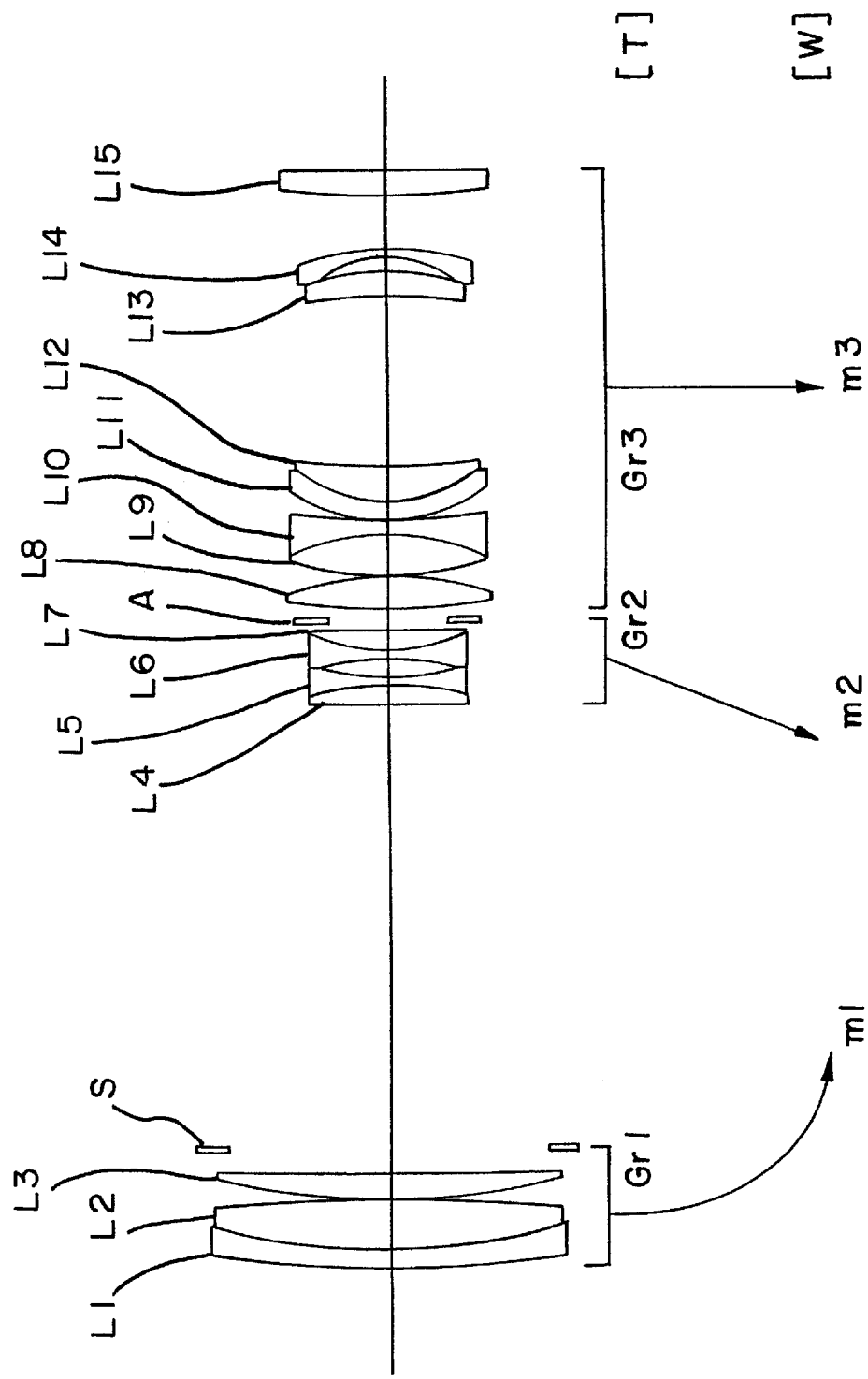
FIG. 3 shows the lens construction of embodiment 3 of the present invention.

FIG. 1 shows the lens construction of embodiment 1, with the locations of lenses when the lens system is in focus on an object located at infinity using the shortest focal length. FIGS. 2 and 3 show embodiments 2 and 3, respectively, and show the locations of lenses when the lens system is in focus on an object located at infinity using the longest focal length. Arrows m1 through m4 in FIG. 1 indicate the loci of the movement of first lens unit Gr1 through fourth lens unit Gr4 from the shortest focal length condition (W) to the longest focal length condition (T) Arrows m1 through m4 in FIGS. 2 and 3 show the loci of the movement of first lens unit. Gr1 through fourth lens unit Gr4 from the longest focal length condition (T) to the shortest focal length condition (W).

In the explanation below, the constructions of embodiments 1 through 3 described above excluding light shielding plate S will be called comparison examples 1 through 3, respectively.

In FIG. 1, embodiment 1 comprises, from the object side, first lens unit Gr1 having a positive refractive power, second lens unit Gr2 having a negative refractive power, third lens unit Gr3 having a positive refractive power and fourth lens unit Gr4 having a negative refractive power.

First lens unit Gr1 comprises, from the object side, negative meniscus lens L1 having a convex surface on the object side and lens L2 with convex surfaces on both sides. Second lens unit Gr2 comprises, from the object side, lens L3 having concave surfaces on both sides and positive meniscus lens L4 having a concave surface on the object side. Third lens unit Gr3 comprises, from the object'side, lens L5 having concave surfaces on both sides, lens L6 having convex surfaces on both sides and lens L7 having convex surfaces on both sides. Fourth lens unit Gr4 comprises, from the object side, positive meniscus lens L8 having a concave surface on the object side and lens L9 having concave surfaces on both sides. Aperture stop A is located on the object side of third lens unit Gr3 and moves together with third lens unit Gr3 during zooming.

In FIG. 1, S is a light shielding plate having a fixed aperture diameter. Light shielding plate S is located on the image side of first lens unit Gr1 and moves together with first lens unit Gr1, or in other words, in the same direction and by the same amount as first lens unit Gr1, during zooming. Focusing in embodiment 1 is attained by zooming out first lens unit Gr1, but light shielding plate S is not moved during focusing.

In FIG. 2, embodiment 2 comprises, from the object side, first lens unit Gr1 having a positive refractive power, second lens unit Gr2 having a negative refractive power, third lens unit Gr3 having a positive refractive power and fourth lens unit Gr4 having a positive refractive power.

First lens unit Gr1 comprises, from the object side, a combination lens consisting of negative meniscus lens L1 having a convex surface on the object side and lens L2 having convex surfaces on both sides, and positive meniscus lens L3 having a convex surface on the object side. Second lens unit Gr2 comprises, from the object side, negative meniscus lens L4 having a convex surface on the object side, lens L5 having concave surfaces on both sides, positive meniscus lens L6 having a convex surface on the object side and lens L7 having concave surfaces on both sides. Third lens unit Gr3 comprises, from the object side, lens L8 having convex surfaces on both sides, a combination lens consisting of lens L9 having convex surfaces on both sides and lens L10 having concave surfaces on both sides, and lens L11 having convex surfaces on both sides. Fourth lens unit Gr4 comprises combined aspherical lens L12 having concave surfaces on both sides, said lens L12 comprising spherical lenses s25 and s26 having concave surfaces on both sides and aspherical surface s24 attached to the object side surface of spherical lenses s25 and s26. Aperture stop A is located on the object side of third lens unit Gr3 and moves together with third lens unit Gr3 during zooming.

In FIG. 2, S is a light shielding plate having a fixed aperture diameter which is used in the present invention. Shielding plate S is located on the image side of first lens unit Gr1. It moves together with first lens unit Gr1, or in other words, in the same direction and by the same amount as first lens unit Gr1, during zooming. Focusing in embodiment 2 is attained by zooming out first lens unit Gr1, but light shielding plate S is not moved during focusing.

In FIG. 3, embodiment 3 comprises, from the object side, first lens unit Gr1 having a positive refractive power, second lens unit Gr2 having a negative refractive power and third lens unit Gr3 having a positive refractive power.

First lens unit Gr1 comprises, from the object side, a combination lens consisting of negative meniscus lens L1 having a convex surface on the object side and lens L2 having convex surfaces on both sides, and positive meniscus lens L3 having a convex surface on the object side. Second lens unit Gr2 comprises, from the object side, a combination lens consisting of positive meniscus lens L4 having a concave surface on the object side and lens L5 having concave surfaces on both sides, and a combination lens consisting of lens L6 having concave surfaces on both sides and lens L7 having convex surfaces on both sides. Third lens unit Gr3 comprises, from the object side, lens L8 having convex surfaces on both sides, a combination lens consisting of lens L9 having convex surfaces on both sides and lens L10 having concave surfaces on both sides, a combination lens consisting of negative meniscus lens L11 having a convex surface on the object side and positive meniscus lens L12 having a convex surface on the object side, positive meniscus lens L13 having a con cave surface on the object side, negative meniscus lens L14 having a concave surface on the object side, and positive meniscus lens L15 having a convex surface on the object side. A is located on the image side of second lens unit Gr2 and moves together with second lens unit Gr2 during zooming.

In FIG. 3, S is a light shielding plate having a fixed aperture diameter which is used in the present invention. Light shielding plate S is located on the image side of first lens unit Gr1. It moves together with first lens unit Gr1, or in other words, in the same direction and by the same amount as first lens unit Gr1, during zooming. Focusing in embodiment 3 is attained by moving out first lens unit Gr1, but light shielding plate S is not moved during focusing.

Figure 6:
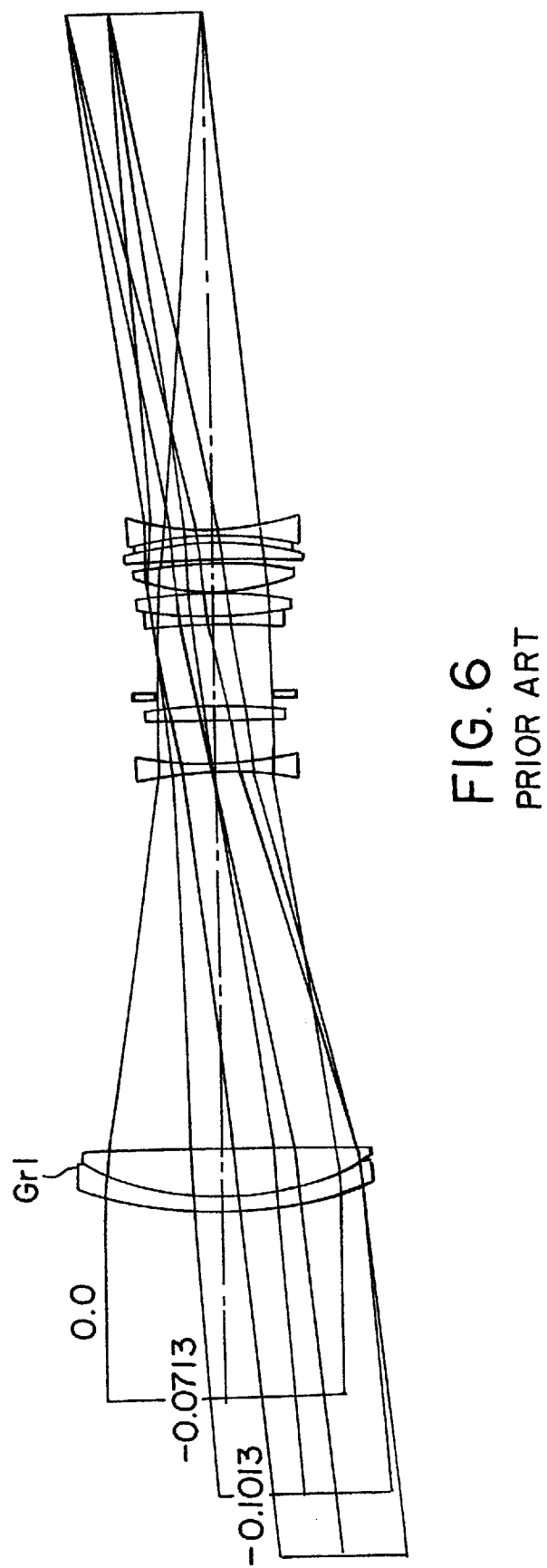
FIG. 6 shows the optical paths of comparison example 1 when the lens system is in focus on an object located at infinity.
Figure 7A:
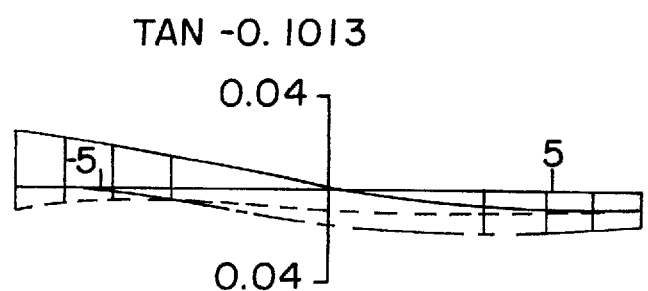
FIG. 7($a$) to FIG. 7($c$) show the aberrations of embodiment 1 of the present invention.
Figure 7B:
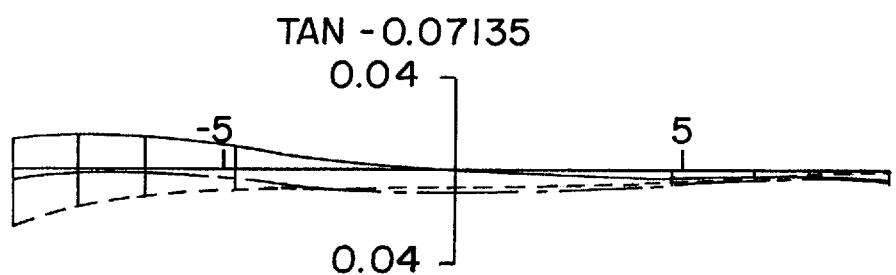
Figure 7C:
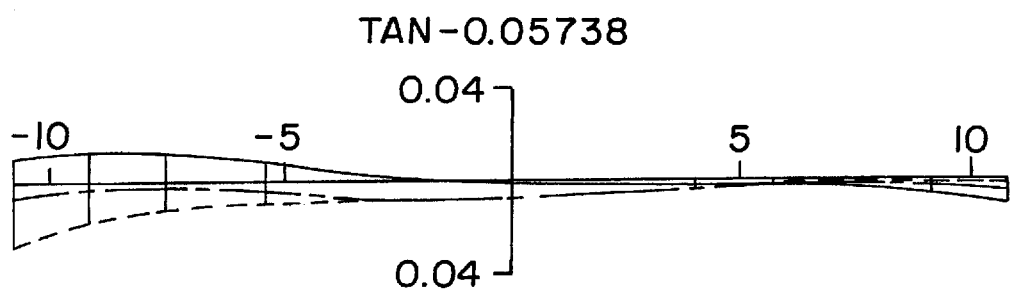
Figure 8A:
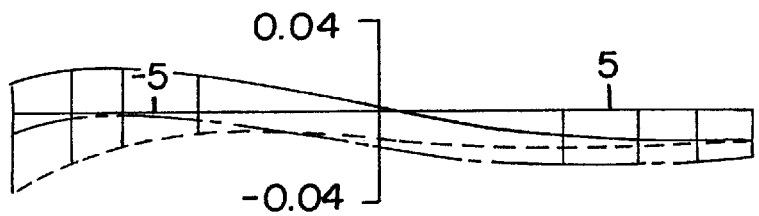
FIG. 8($a$) to FIG. 8($c$) show the aberrations of to comparison example 1.
Figure 8B:
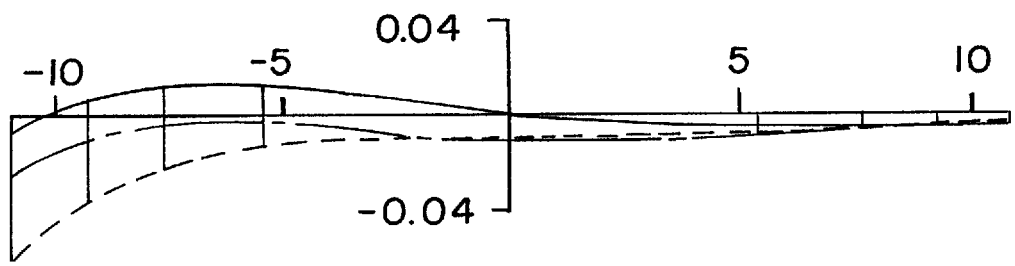
Figure 8C:
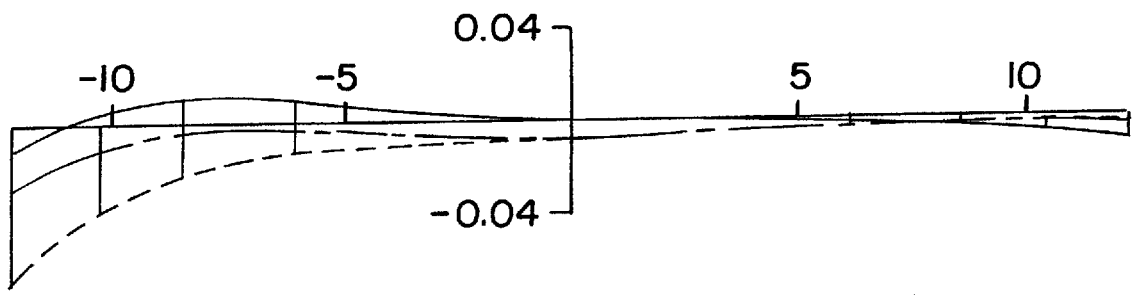
Figure 9A:
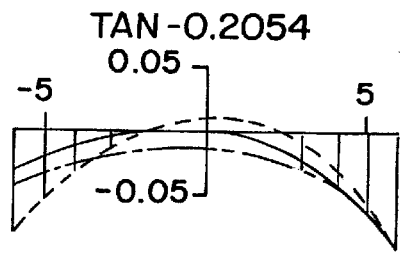
FIG. 9($a$) to FIG. 9($e$) show the aberrations of to embodiment 2 of the present invention.
Figure 9B:
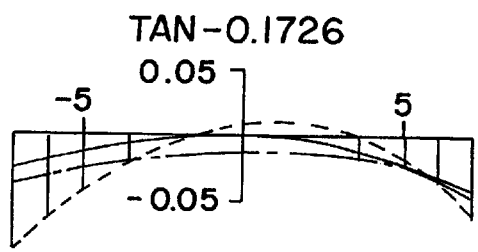
Figure 9C:
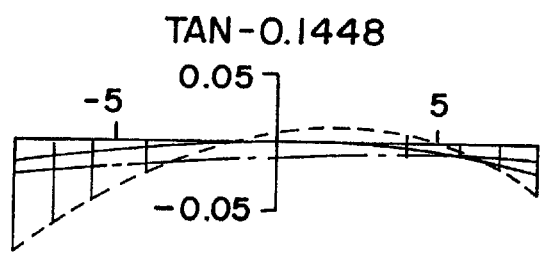
Figure 9D:
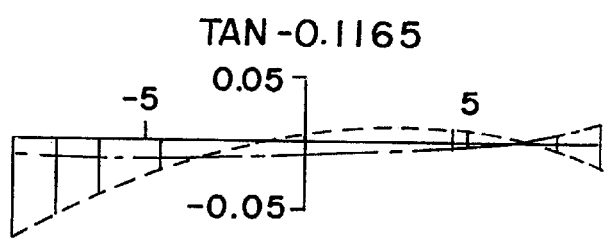
Figure 9E:
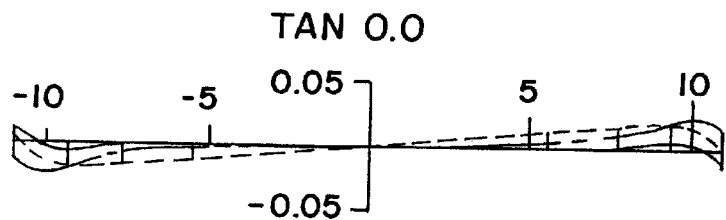
Figure 10A:
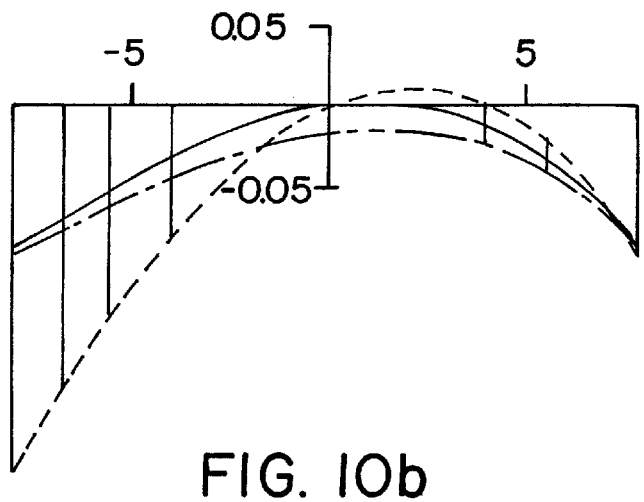
FIG. 10($a$) to FIG. 10($e$) show the aberrations of comparison example 2.
Figure 10B:
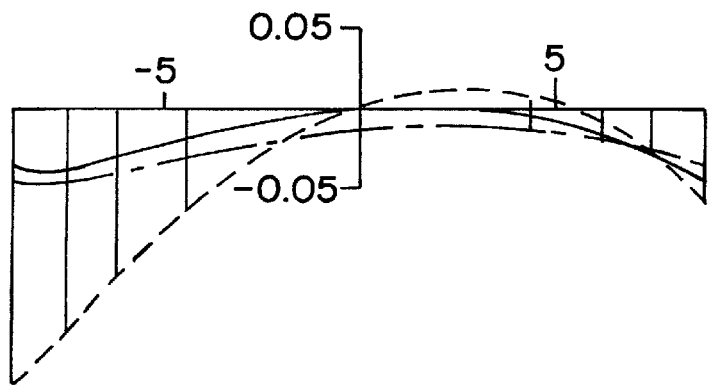
Figure 10C:
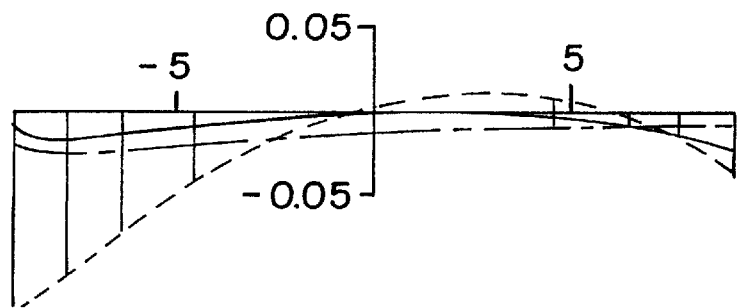
Figure 10D:
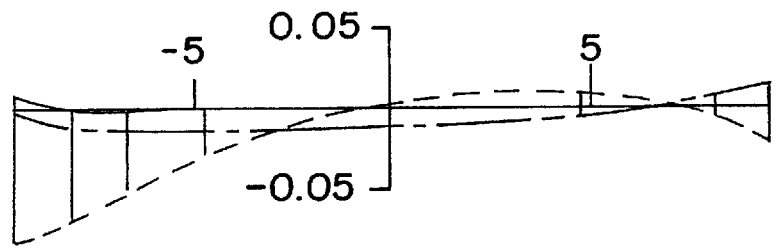
Figure 10E:
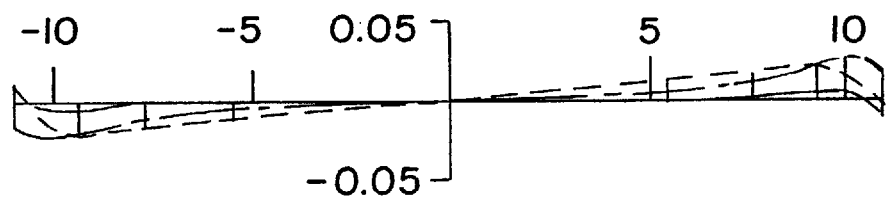
Figure 11A:
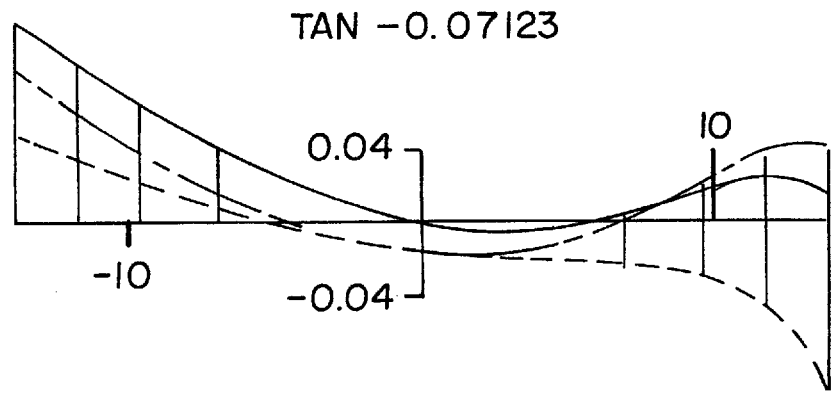
FIG. 11($a$) to FIG. 11($e$) show the aberrations of example 3 of the present invention.
Figure 11B:
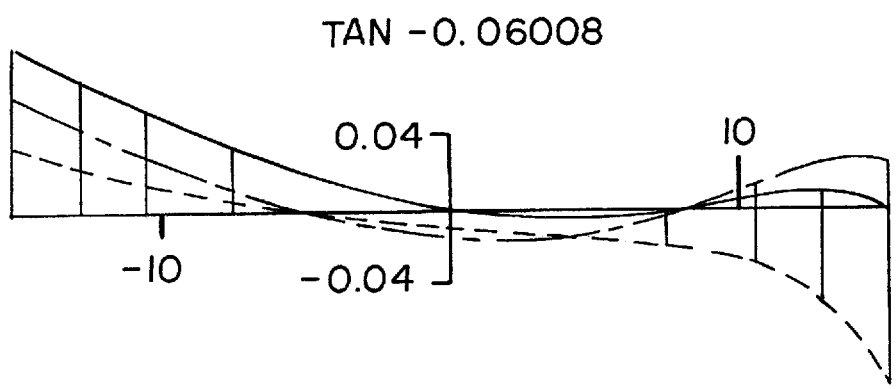
Figure 11C:
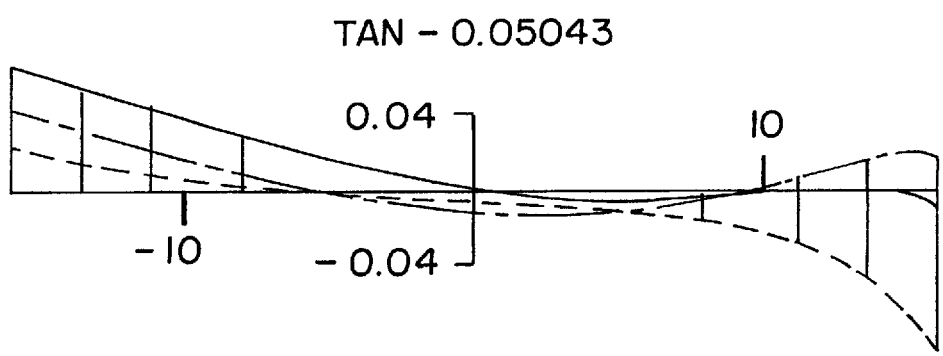
Figure 11D:
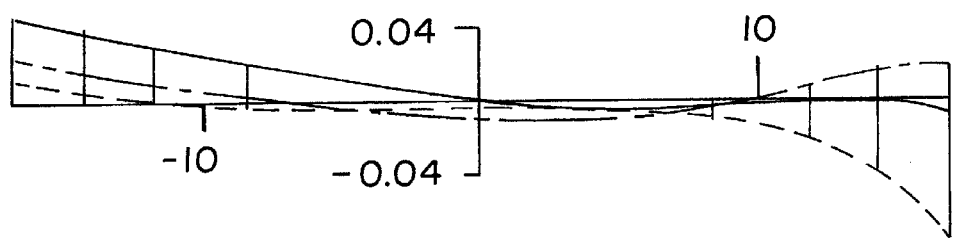
Figure 11E:
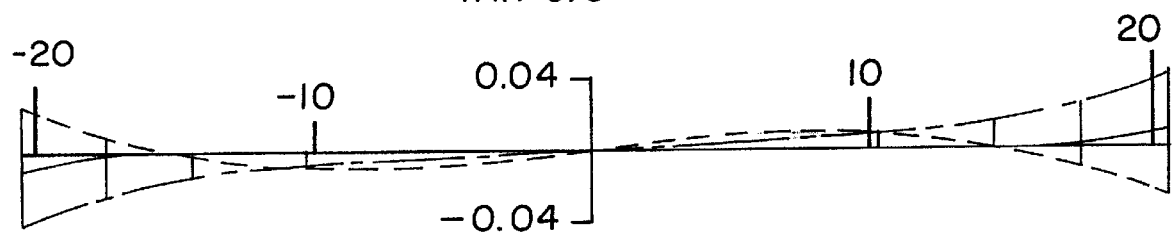
Figure 12A:
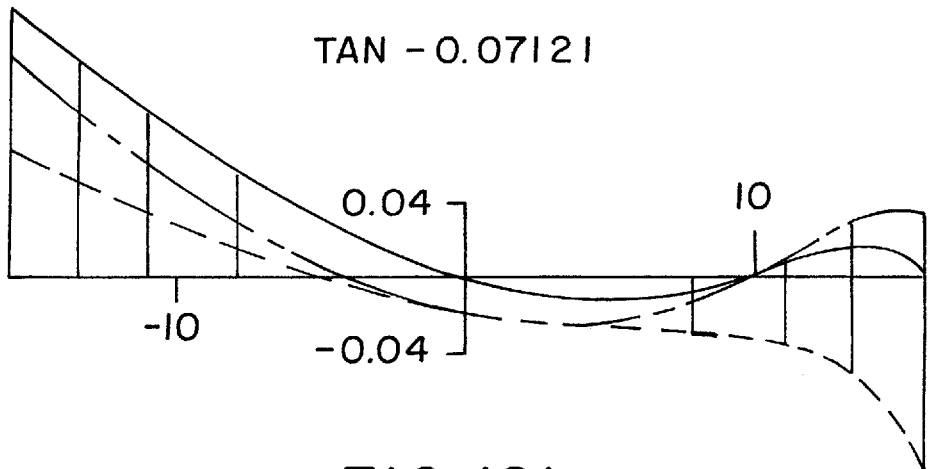
FIG. 12($a$) to FIG. 12($e$) show the aberrations of comparison example 3.
Figure 12B:
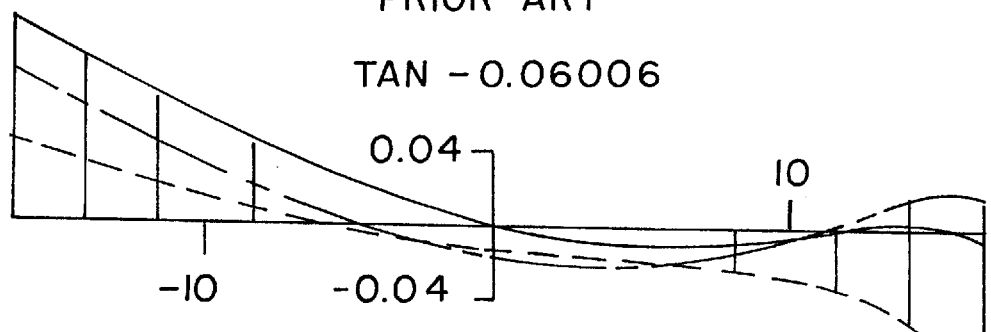
Figure 12C:
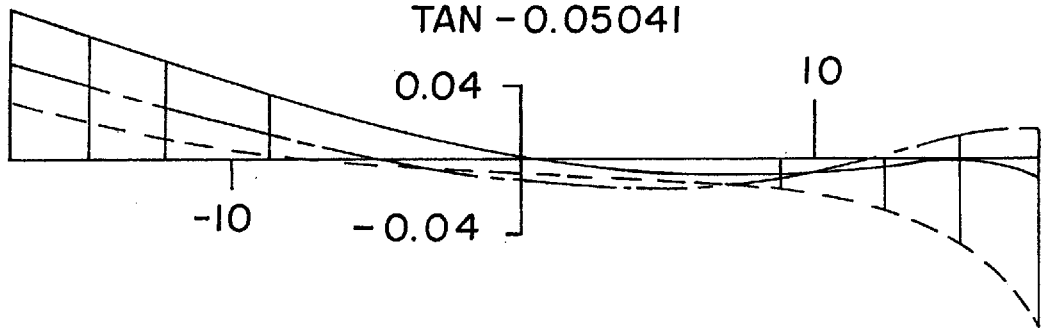
Figure 12D:
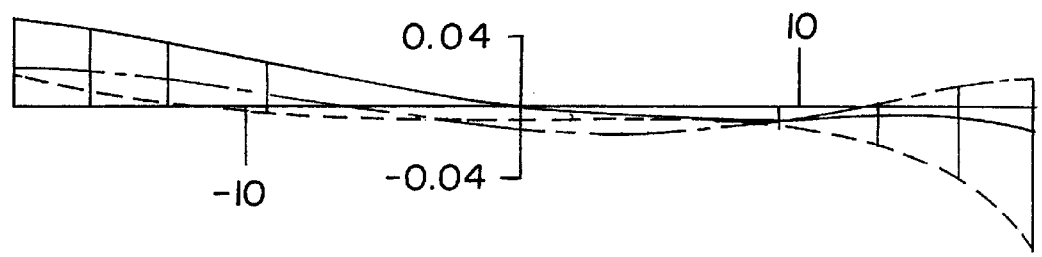
Figure 12E:
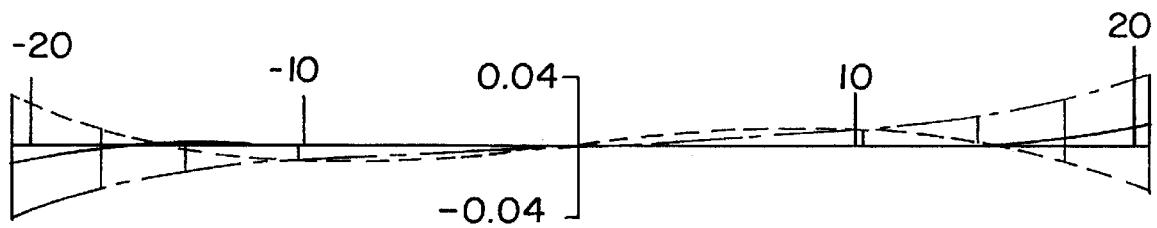

FIG. 6 shows the optical paths when focusing has been performed on an object located at infinity in comparison example 1. Since this comparison example does not have a light shielding plate, the lower extra-axial light rays are regulated by the effective diameter of first lens unit Gr1. In the case of the comparison example, flaring occurs due to the lower extra-axial light rays.

Figure 4:
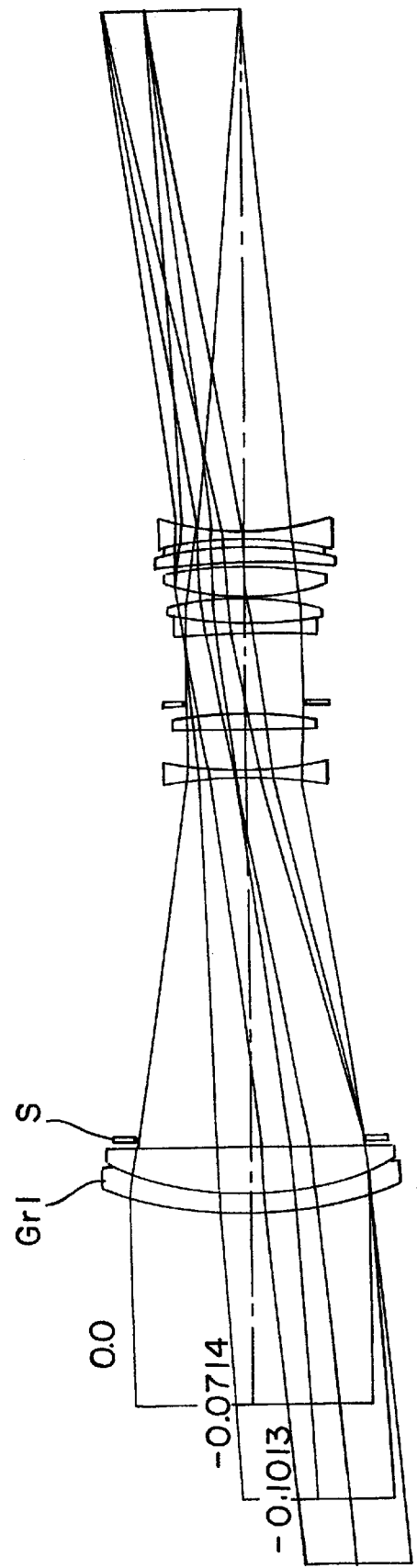
FIG. 4 shows the optical paths of embodiment 1 of the present invention when the lens system is in focus on an object located at infinity.

On the other hand, in embodiments 1 through 3 described above, the lower extra-axial light rays, which are the cause of flaring in comparison example 1, are shielded by light shielding plate S. With regard to embodiment 1, FIG. 4 clearly shows how the lower extra-axial light rays are shielded by light shielding plate S. As shown in this drawing, the lower extra-axial light rays are shielded by light shielding plate S in embodiments 1 through 3, and therefore flaring is prevented from occurring.

Figure 5:
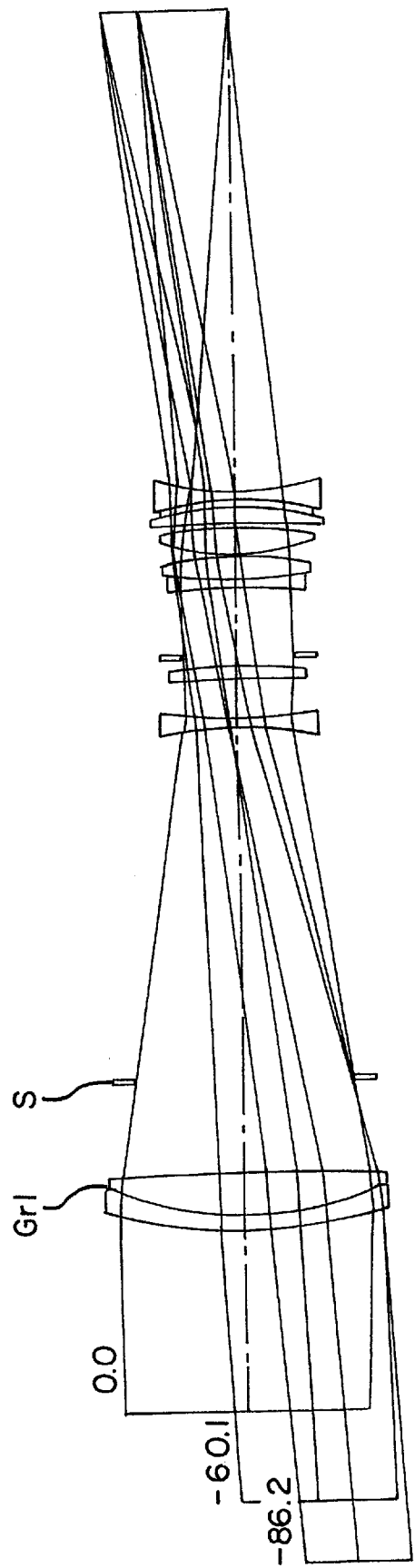
FIG. 5 shows the optical paths of embodiment 1 of the present invention when the lens system is in focus on a close-range object.

FIG. 5 shows the optical paths when focusing has been performed in embodiment 1 on a close-range object using the longest focal length (this corresponds to close-range distance 1.1 in embodiment 1 described below). As is clear from this drawing, adequate light is secured for peripheral areas when the lens system is in focus on a close-range object as well in the present invention.

Tables 1 through 3 show embodiments, i.e., specific representations of the embodiments described above. Embodiment 1 in Table 1 is a specific representation corresponding to embodiment 1, embodiment 2 in Tables 2 is a specific representation corresponding to embodiment 2, and embodiment 3 in Table 3 is a specific representation corresponding to embodiment 3. In each embodiment, ri (i=1, 2, 3, . . . ) represents the radius of curvature of the ith lens surface from the object side; di (i=1, 2, 3, . . . ) represents the ith axial distance from the object side; and Ni (i=1, 2, 3, . . . ) and vi (i=1, 2, 3, . . . ) represent the refractive index and the Abbe number with regard to the d-line of the ith lens from the object side, respectively. Focal length f and F-number FNO of the entire lens system in the shortest focal length condition (W), middle focal length condition (M) and longest focal length condition (T) are also shown.

In embodiment 2, the surfaces marked with asterisks in the radius of curvature column are aspherical. The configuration of an aspherical surface is defined by equation shown below.

$$x(y) = \frac{C \cdot y^2}{1 + \sqrt{1 - \epsilon \cdot C^2 \cdot y^2}} + \sum_{i \geq 2} Ai \cdot y^i$$

Where, x: height in a direction vertical to the optical axis;

y: amount of displacement from the reference spherical surface along the optical axis;

C: paraxial curvature;

ε: quadratic surface parameter; and

Ai: ith aspherical coefficient.

TABLE 1

(1st Embodiment)
f = 57.4 to 98.7 to 165.8   Fno. = 4.61 to 5.38 to 5.55

| Radius of Curvature | | Axial Distance | | Refractive Index | | Abbe number | |
|---|---|---|---|---|---|---|---|
| r1 | 59.535 | | | | | | |
| | | d1 | 1.850 | N1 | 1.84666 | v1 | 23.82 |
| r2 | 40.872 | | | | | | |
| | | d2 | 0.250 | | | | |
| r3 | 43.289 | | | | | | |
| | | d3 | 5.500 | N2 | 1.69680 | v2 | 56.47 |
| r4 | −1011.542 | | | | | | |
| | | d4 | 1.000 | | | | |
| r5 | ∞ | | | | | | |
| | | d5 | 1.129 to 22.582 to 45.635 | | | | |
| r6 | −48.633 | | | | | | |
| | | d6 | 1.000 | N3 | 1.69680 | v3 | 56.47 |
| r7 | 56.720 | | | | | | |
| | | d7 | 5.200 | | | | |
| r8 | −341.045 | | | | | | |
| | | d8 | 1.800 | N4 | 1.83350 | v4 | 21.00 |
| r9 | −71.385 | | | | | | |
| | | d9 | 25.791 to 12.985 to 1.350 | | | | |
| r10 | ∞ | | | | | | |
| | | d10 | 9.000 | | | | |
| r11 | −155.628 | | | | | | |
| | | d11 | 1.000 | N5 | 1.76182 | v5 | 26.55 |
| r12 | 46.061 | | | | | | |
| | | d12 | 0.370 | | | | |
| r13 | 86.703 | | | | | | |
| | | d13 | 2.750 | N6 | 1.69680 | v6 | 56.47 |
| r14 | −41.957 | | | | | | |
| | | d14 | 0.150 | | | | |
| r15 | 29.741 | | | | | | |
| | | d15 | 3.500 | N7 | 1.48749 | v7 | 70.44 |
| r16 | −66.045 | | | | | | |
| | | d16 | 20.587 to 11.940 to 0.522 | | | | |
| r17 | −343.007 | | | | | | |
| | | d17 | 2.300 | N8 | 1.75000 | v8 | 25.17 |
| r18 | −40.930 | | | | | | |
| | | d18 | 0.700 | | | | |
| r19 | −42.274 | | | | | | |
| | | d19 | 1.000 | N9 | 1.77250 | v9 | 49.77 |
| r20 | 36.932 | | | | | | |

TABLE 2

(2nd Embodiment)
f = 36.0 to 66.5 to 102.0   Fno. = 3.60 to 4.80 to 4.65

| Radius of Curvature | | Axial Distance | | Refractive Index | | Abbe number | |
|---|---|---|---|---|---|---|---|
| r1 | 115.469 | | | | | | |
| | | d1 | 2.100 | N1 | 1.84666 | v1 | 23.82 |
| r2 | 44.489 | | | | | | |
| | | d2 | 7.350 | N2 | 1.67000 | v2 | 57.07 |
| r3 | −343.699 | | | | | | |
| | | d3 | 0.100 | | | | |
| r4 | 29.399 | | | | | | |
| | | d4 | 3.250 | N3 | 1.69680 | v3 | 56.47 |
| r5 | 50.429 | | | | | | |
| | | d5 | 5.750 | | | | |
| r6 | ∞ | | | | | | |
| | | d6 | −4.900 to 5.498 to 12.043 | | | | |
| r7 | 67.068 | | | | | | |
| | | d7 | 1.150 | N4 | 1.77250 | v4 | 49.77 |
| r8 | 14.318 | | | | | | |
| | | d8 | 3.950 | | | | |
| r9 | −684.360 | | | | | | |
| | | d9 | 1.100 | N5 | 1.67000 | v5 | 57.07 |
| r10 | 36.228 | | | | | | |
| | | d10 | 0.280 | | | | |
| r11 | 19.738 | | | | | | |

TABLE 2-continued

| | | | | | | | |
|---|---|---|---|---|---|---|---|
| | | d11 | 2.600 | N6 | 1.84666 | v6 | 23.83 |
| r12 | 111.064 | | | | | | |
| | | d12 | 1.620 | | | | |
| r13 | −29.167 | | | | | | |
| | | d13 | 1.100 | N7 | 1.58913 | v7 | 61.11 |
| r14 | 70.766 | | | | | | |
| | | d14 | 14.488 to 6.683 to 1.360 | | | | |
| r15 | ∞ | | | | | | |
| | | d15 | 1.000 | | | | |
| r16 | 24.604 | | | | | | |
| | | d16 | 3.150 | N8 | 1.67000 | v8 | 57.07 |
| r17 | −71.587 | | | | | | |
| | | d17 | 0.150 | | | | |
| r18 | −36.391 | | | | | | |
| | | d18 | 6.000 | N9 | 1.51680 | v9 | 64.20 |
| r19 | −15.033 | | | | | | |
| | | d19 | 2.500 | N10 | 1.80741 | v10 | 31.59 |
| r20 | 91.766 | | | | | | |
| | | d20 | 4.700 to 2.107 to to 0.886 | | | | |
| r21 | 59.139 | | | | | | |
| | | d21 | 3.000 | N11 | 1.72000 | v11 | 42.02 |
| r22 | −22.069 | | | | | | |
| | | d22 | 0.400 | | | | |
| r23 | ∞ | | | | | | |
| | | d23 | 3.210 | | | | |
| r24* | −25.829 | | | | | | |
| | | d24 | 0.035 | N12 | 1.51790 | v12 | 52.31 |
| r25 | 22.819 | | | | | | |
| | | d25 | 1.800 | N13 | 1.80500 | v13 | 40.97 |
| r26 | 438.400 | | | | | | |

Asphrical coefficient r24* ε   0.10000 × 10
A4  −0.65989 × 10$^{-4}$
A6  −0.64604 × 10$^{-7}$
A8  −0.64909 × 10$^{-8}$
A10  0.11842 × 10$^{-9}$
A12  −0.83160 × 10$^{-12}$

TABLE 3

(3rd Embodiment)
f = 61.6 to 154.0 to 234.0   Fno. = 4.6 to 5.0 to 5.7

| Radius of Curvature | | Axial Distance | | Refractive Index | | Abbe number | |
|---|---|---|---|---|---|---|---|
| r1 | 148.425 | | | | | | |
| | | d1 | 2.064 | N1 | 1.80518 | v1 | 25.43 |
| r2 | 71.954 | | | | | | |
| | | d2 | 6.191 | N2 | 1.60311 | v2 | 60.68 |
| r3 | −392.957 | | | | | | |
| | | d3 | 0.079 | | | | |
| r4 | 88.647 | | | | | | |
| | | d4 | 3.175 | N3 | 1.49831 | v3 | 65.03 |
| r5 | 1042.916 | | | | | | |
| | | d5 | 3.175 | | | | |
| r6 | ∞ | | | | | | |
| | | d6 | −2.254 to 44.173 to 54.761 | | | | |
| r7 | −1559.892 | | | | | | |
| | | d7 | 2.381 | N4 | 1.76182 | v4 | 26.55 |
| r8 | −42.910 | | | | | | |
| | | d8 | 1.191 | N5 | 1.83400 | v5 | 37.17 |
| r9 | 39.045 | | | | | | |
| | | d9 | 2.246 | | | | |
| r10 | −35.060 | | | | | | |
| | | d10 | 1.191 | N6 | 1.77250 | v6 | 49.60 |
| r11 | 27.813 | | | | | | |
| | | d11 | 2.381 | N7 | 1.84666 | v7 | 23.89 |
| r12 | −803.368 | | | | | | |
| | | d12 | 1.254 | | | | |
| r13 | ∞ | | | | | | |
| | | d13 | 21.082 to 10.462 to 1.262 | | | | |
| r14 | 61.199 | | | | | | |
| | | d14 | 3.969 | N8 | 1.51680 | v8 | 64.20 |

TABLE 3-continued (3rd Embodiment)
f = 61.6 to 154.0 to 234.0   Fno. = 4.6 to 5.0 to 5.7

| Radius of Curvature | | Axial Distance | | Refractive Index | | Abbe number | |
|---|---|---|---|---|---|---|---|
| r15 | −31.132 | | | | | | |
| | | d15 | 0.079 | | | | |
| r16 | 36.148 | | | | | | |
| | | d16 | 5.239 | N9 | 1.48749 | v9 | 70.21 |
| r17 | −27.226 | | | | | | |
| | | d17 | 1.572 | N10 | 1.80610 | v10 | 40.94 |
| r18 | 68.120 | | | | | | |
| | | d18 | 0.079 | | | | |
| r19 | 20.003 | | | | | | |
| | | d19 | 2.318 | N11 | 1.76182 | v11 | 26.55 |
| r20 | 16.923 | | | | | | |
| | | d20 | 4.199 | N12 | 1.51633 | v12 | 64.15 |
| r21 | 106.133 | | | | | | |
| | | d21 | 21.241 | | | | |
| r22 | −75.629 | | | | | | |
| | | d22 | 2.802 | N13 | 1.56732 | v13 | 42.82 |
| r23 | −34.616 | | | | | | |
| | | d23 | 2.215 | | | | |
| r24 | −13.740 | | | | | | |
| | | d24 | 0.873 | N14 | 1.77250 | v14 | 49.60 |
| r25 | −29.099 | | | | | | |
| | | d25 | 6.723 | | | | |
| r26 | 101.990 | | | | | | |
| | | d26 | 3.000 | N15 | 1.78472 | v15 | 25.75 |
| r27 | 3859.961 | | | | | | |

In embodiment 1 shown above, during focusing on a close-range object (object distance 1.1 m), distance d4 between first lens unit Gr1 and light shielding plate S is increased to 12.08 m.

In embodiments 2 shown above, during focusing on a close range object (object distance 1.2 m), distance d5 between first lens unit Gr1 and light shielding plate S is increased to 9.745 mm.

In embodiment 3 shown above, during focusing on a close-range object (object distance 1.2 m), distance d5 between first lens unit Gr1 and light shielding plate S is increased to 16.218 mm.

FIGS. 7(a) through 7(c), 9(a) through 9(e) and 11(a) through 11(e) show Gaussian plane transverse aberration in the meridional direction regarding embodiments 1 through 3, respectively. FIGS. 8(a) through 8(c), 10(a) through (e) and 12(a) through 12(e) show Gaussian plane transverse aberration in the meridional direction regarding comparison examples 1 through 3, which are equivalent to the embodiments mentioned above excluding light shielding plate S. In the drawings, the solid line, dotted line and chain line represent aberration with regard to the d-line, g-line and c-line, respectively. Also, in the drawings, the values of tangent represent values of tangent of half angles of view of incident light.

As explained above, a light shielding plate that moves in the same direction and by the same amount as the first lens unit during zooming but does not move during focusing is used in the present invention. As a result, adequate light is secured for peripheral areas when the lens system is in focus on a close-range object and the occurrence of flaring is prevented when the lens system is in focus on an object located at infinity.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be as included therein.

What is claimed is:

1. A zoom lens system comprising:
   a first lens unit located closest to an object side and moves in an optical axis direction both during zooming and focusing; and
   a light shielding plate which moves in a same direction and by same amount as the first lens unit during zooming, while the light shielding plate being stationary during focusing.

2. A zoom lens system as claimed in claim 1, wherein said first lens unit has a positive refractive power.

3. A zoom lens system as claimed in claim 1, wherein said zoom lens system has a aperture stop other than said light shielding plate.

4. A zoom lens system as claimed in claim 1, comprising, from an object side, the first lens unit having a positive refractive power and a second lens unit having a negative refractive power.

5. A zoom lens system as claimed in claim 4, comprising, from an object side, the first lens unit having a positive refractive power, the second lens unit having a negative refractive power, a third lens unit having a positive refractive power and a fourth lens unit having a negative refractive power.

6. A zoom lens system as claimed in claim 4, comprising, from an object side, the first lens unit having a positive refractive power, the second lens unit having a negative refractive power, a third lens unit having a positive refractive power and a fourth lens unit having a positive refractive power.

7. A zoom lens system as claimed in claim 4, comprising, from an object side, the first lens unit having a positive refractive power, the second lens unit having a negative refractive power and a third lens unit having a positive refractive power.

8. A zoom lens system as claimed in claim 1, wherein said first lens unit moves in a same direction both during zooming and focusing.

9. A zoom lens system comprising:
   a plurality of movable lens units including a first lens unit located closest to an object side, the first lens unit is movable during a zooming mode of operation and also is movable during a focusing mode of operation;
   a light shielding member mounted adjacent the first lens unit for movement with the first lens unit during the zooming mode of operation and for being held stationary during the focusing mode of operation when the first lens unit is moved; and
   an aperture stop located on the image side of the light shielding member.

10. The zoom lens system of claim 9 wherein the light shielding member has a fixed aperture diameter.

11. The zoom lens system of claim 9 wherein a second lens unit and a third lens unit are provided on the image side of the first lens unit and the aperture stop moves with the third lens unit during the zooming mode of operation.

12. The zoom lens system of claim 11 wherein a fourth lens unit is provided on the image side of the third lens unit.

13. The zoom lens system of claim 11 wherein the first lens unit has the light shielding member mounted on its image side.

14. The zoom lens system of claim 11 wherein the first lens unit comprises, from the object side, a doublet including a negative meniscus lens and a positive meniscus lens on the image side of the doublet having a convex surface on the object side.

15. A zoom lens system comprising, from the object side:
- a first lens unit of a positive power that is movable in a zooming mode of operation and also is movable during a focusing mode of operation;
- a second lens unit of a negative power;
- a third lens unit of a positive power that is movable during a zooming mode of operation;
- a fourth lens unit of a negative power;
- a light shielding member mounted adjacent the first lens unit for movement with the first lens unit during the zooming mode of operation and for being held stationary during the focusing mode of operation when the first lens is moved during a focusing mode of operation; and
- an aperture stop mounted adjacent the third lens unit and movable during a zooming mode of operation.

* * * * *